(12) United States Patent
Chen et al.

(10) Patent No.: US 8,042,031 B2
(45) Date of Patent: Oct. 18, 2011

(54) MAXIMUM LIKELIHOOD DETECTION METHOD AND SYSTEM

(75) Inventors: Chin-Hung Chen, Tainan (TW); Yu-Tao Hsieh, Hsinchu (TW); Jen-Yuan Hsu, Kinmen County (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 919 days.

(21) Appl. No.: 11/907,487

(22) Filed: Oct. 12, 2007

(65) Prior Publication Data

US 2008/0181339 A1 Jul. 31, 2008

Related U.S. Application Data

(60) Provisional application No. 60/871,311, filed on Dec. 21, 2006.

(51) Int. Cl.
*H03M 13/39* (2006.01)

(52) U.S. Cl. .......... 714/794; 375/341

(58) Field of Classification Search .......... 375/341; 714/794
See application file for complete search history.

(56) References Cited

U.S. PATENT DOCUMENTS

| | | | | |
|---|---|---|---|---|
| 6,757,337 B2 * | 6/2004 | Zhuang et al. | | 375/267 |
| 7,216,267 B2 * | 5/2007 | Santraine et al. | | 714/709 |
| 7,233,634 B1 * | 6/2007 | Hassell Sweatman et al. | | 375/346 |
| 7,236,536 B2 * | 6/2007 | Hochwald et al. | | 375/265 |
| 7,308,047 B2 * | 12/2007 | Sadowsky | | 375/324 |
| 7,317,770 B2 * | 1/2008 | Wang | | 375/340 |
| 7,489,746 B1 * | 2/2009 | Awater et al. | | 375/341 |
| 7,889,807 B2 * | 2/2011 | Kim et al. | | 375/267 |
| 2003/0076890 A1 | 4/2003 | Hochwald et al. | | |
| 2003/0236076 A1 | 12/2003 | Brunel | | |
| 2004/0181419 A1 | 9/2004 | Davis et al. | | |
| 2005/0008091 A1 | 1/2005 | Boutros et al. | | |
| 2005/0094742 A1 | 5/2005 | Yee | | |
| 2005/0111592 A1 | 5/2005 | Yee | | |
| 2005/0128936 A1 | 6/2005 | Shao | | |
| 2005/0135498 A1 | 6/2005 | Yee | | |
| 2005/0175122 A1 | 8/2005 | Nefedov et al. | | |
| 2005/0210039 A1 | 9/2005 | Garrett | | |
| 2006/0059410 A1 | 3/2006 | Santraine et al. | | |

(Continued)

FOREIGN PATENT DOCUMENTS

| | | |
|---|---|---|
| CN | 1671092 A | 9/2005 |
| CN | 1701580 A | 11/2005 |

OTHER PUBLICATIONS

Electronics Letters Oct. 25, 2001 vol. 37 No. 22; Efficient algorithm for decoding layered space-time codes; D. Wubben et al.; pp. 1348-1350.

(Continued)

*Primary Examiner* — Stephen M Baker
(74) *Attorney, Agent, or Firm* — Birch, Stewart, Kolasch and Birch, LLP

(57) ABSTRACT

A maximum likelihood detection (MLD) method is disclosed. Received data is processed to obtain preliminary parameters. An initial radius r is determined. $r^2$ is multiplied by a corresponding scaling factor according to a partial Euclidean distance (PED) constraint function to determine the upper limit values of PED for each layer. It is examined whether a sub-lattice exceeds a search scope according to the upper limit values of PED for each layer to search a better solution by utilizing the preliminary parameters.

24 Claims, 20 Drawing Sheets

U.S. PATENT DOCUMENTS

2006/0146965 A1     7/2006   Kwun et al.
2006/0198470 A1     9/2006   Yu

OTHER PUBLICATIONS

IEEE Communications Letters, vol. 8, No. 5, May 2004; Reduced Complexity Schnorr-Euchner Decoding Algorithms for MIMO Systems;Zhan Guo et al; pp. 286-288.

IEEE Transactions on Information Theory, vol. 48, No. 8, August 2002; Closest Point Search in Lattices; Erik Agrell et al.; pp. 2201-2214.

Lattice Basis Reduction: Improved Practical Algorithms and Solving Subset Sum Problems; C.P. Schnorr et al.; Universitat Frankfurt, Fachbereich Mathematik/Informatik postfach 111932 6000 Frankfurt am Main Germany Jul. 1993; pp. 1-27.

* cited by examiner

Algorithm SE1: $\hat{s} = SE1(\mathbf{L}, \mathbf{Q}, \mathbf{x})$
1: $n = 2M$, i.e., the size of $\mathbf{L}$
2: $bestdist = 2^{10}$
3: $k = n$
4: $dist_k = 0$
5: $\mathbf{e}_k = \mathbf{x}^T \mathbf{QL}$
6: $u_k = rint(e_{kk})$
7: $y = (e_{kk} - u_k)/l_{kk}$
8: $step_k = sgn(y)$
9: loop
10:     $newdist = dist_k + y^2$
11:     if $newdist < bestdist$ then
12:     if $k > 1$ then
13:         for $i = 1$ to $k - 1$ do
14:             $e_{k-1,i} = e_{k,i} - y * l_{ki}$
15:         end for
16:         $k = k - 1$
...

replaced by $f_{anodist} = newdist + F_k$
if $f_{anodist} < bestdist$ then

$F_k = F_{k-1} + \alpha\sigma^2 l_{k-1,k-1} \quad (k = 2, 3, \ldots, n)$ $E\{\|\mathbf{x} - \mathbf{Hs}\|^2\} = E\{\|\mathbf{v}\|^2\} = n\sigma^2.$

FIG. 5

MAXIMUM LIKELIHOOD DETECTION METHOD AND SYSTEM

This Nonprovisional application claims priority under 35 U.S.C. §119(e) on U.S. Provisional Application No(s). 60/871,311 filed on Dec. 21, 2006, the entire contents of which are hereby incorporated by reference.

BACKGROUND OF THE INVENTION

1. Field of the Invention

The invention relates to wireless communication, and more particularly to a maximum likelihood detection (MLD) method and system, applying a sphere decoder to multiple-input multiple-output (MIMO) technology.

2. Description of the Related Art

MIMO is an abstract mathematical model for multi-antenna communication systems. MIMO technology has attracted the attention of wireless communications developers, because it significantly increases transmission throughput and range at the same bandwidth and same overall transmitting power. In general, MIMO technology increases the spectral efficiency of a wireless communication system. MIMO exploits the multipath scattering effect to increase data throughput and range, or reduce bit error rate, rather than attempting to eliminate it as in conventional SISO (Single-Input Single-Output) communication systems. MIMO can also be used in conjunction with Orthogonal Frequency Division Multiplexing (OFDM), and is now part of the IEEE 802.16 standard and will also be included in the IEEE 802.11n High-Throughput standard, which is expected to be finalized in mid 2007. Standardization of MIMO to be used in 3G standards such as High-Speed Downlink Packet Access (HSDPA) is currently ongoing. A typical MIMO data model is illustrated in FIG. 1.

A baseband equivalent data model in which a transmitter comprises $N_t$ transmit antennas and a receiver comprises $N_r$ receive antennas is represented as:

$$\tilde{y} = \tilde{H}\tilde{s} + \tilde{n},$$

where, $$\tilde{y} = \begin{bmatrix} y_1 \\ y_2 \\ \vdots \\ y_{N_r} \end{bmatrix},$$

$$\tilde{s} = \begin{bmatrix} s_1 \\ s_2 \\ \vdots \\ s_{N_t} \end{bmatrix},$$

$$\tilde{n} = \begin{bmatrix} n_1 \\ n_2 \\ \vdots \\ n_{N_r} \end{bmatrix},$$

$$\tilde{H} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r1} & h_{N_r2} & \cdots & h_{N_rN_t} \end{bmatrix},$$

$\tilde{n}$ represents the noise added to the receiver, $\tilde{H}$ represents a channel transformation function, and $h_{ij}$ represents the channel response from j-th transmit antenna to i-th receive antenna. Referring to the baseband data model, $\tilde{y}$, $\tilde{s}$, $\tilde{n}$, and $\tilde{H}$ are complex vectors, which can be converted to a real data model, represented as:

$$\underbrace{\begin{bmatrix} \text{Re}(\tilde{y}) \\ \text{Im}(\tilde{y}) \end{bmatrix}}_{y} = \underbrace{\begin{bmatrix} \text{Re}(\tilde{H}) & -\text{Im}(\tilde{H}) \\ \text{Im}(\tilde{H}) & \text{Re}(\tilde{H}) \end{bmatrix}}_{H} \underbrace{\begin{bmatrix} \text{Re}(\tilde{s}) \\ \text{Im}(\tilde{s}) \end{bmatrix}}_{s} + \underbrace{\begin{bmatrix} \text{Re}(\tilde{n}) \\ \text{Im}(\tilde{n}) \end{bmatrix}}_{n}.$$

A MIMO receiver detects the transmitted symbols 's' according to the received signals 'y'.

Typically, maximum likelihood detection (MLD), with complexity proportional to $2^{N_t * M_c}$, where $N_t$ is the number of transmit antennas and $M_c$ is the modulation order, is considered the optimal signal detection method. If the transmitter, for example, comprises 4 antennas, indicating signal s comprises 4 symbols ($s_1 \sim s_4$) and each symbol is modulated according to 64-quadrature amplitude modulation (64-QAM, $M_c$=6), to obtain the optimal solution, the receiver must examine $64^4$ possible solutions. Such a high-complexity method, however, may in practice be impossible to implement. Accordingly, sub-optimal detection methods with lower complexity are provided, such as Vertical Bell Laboratories Layered Space-Time (V-BLAST), Zero Forcing (ZF), and Minimum Mean Square Error (MMSE). Furthermore, a sphere decoding (SD) method is also provided to efficiently decrease the complexity of the MLD. Conventional ML detection methods introduce a cost function that considers $N_t$ transmitted symbols jointly while the sphere decoding method, on the other hand, can take apart the joint cost function into partial functions such that signal combinations apparently exceeding predefined cost constraints can be reasonably eliminated. The MLD is mathematically described to be equivalently represented as:

$$\hat{s}_{ML} = \underset{s \in \Lambda}{\text{argmin}} \|y - Hs\|^2$$

$$= \underset{s \in \Lambda}{\text{argmin}} \{(s - \hat{s}_{ZF})^H H^H H(s - \tilde{s}_{ZF}) + y^H(I - H(H^H H)^{-1} H^H)y\}$$

$$= \underset{s \in \Lambda}{\text{argmin}} \{(s - \tilde{s}_{ZF})^H H^H H(s - \tilde{s}_{ZF})\}$$

$$= \underset{s \in \Lambda}{\text{argmin}} \{\|H(s - \tilde{s}_{ZF})\|^2 \leq r^2\}.$$

The symbol ^ indicates a set of all symbol vectors 's' and $\|H(s-\tilde{s}_{ZF})\|^2$ indicates a transformed cost function. The set of {Hs} is regarded as the lattice generated by H and 's' can be regarded as the coordinates of the lattice point. The MLD method searches the lattice to locate a lattice point closest to $H\tilde{s}_{ZF}$. Thus, $H\tilde{s}_{ZF}$ can be served as a sphere center, and an abstract spherical surface in multidimensional space can be created when an applicable radius 'r' is defined. The MLD method searches out the coordinate of a lattice point closest to the sphere center $H\tilde{s}_{ZF}$, as shown in FIG. 2. The MLD equivalent function is further simplified and represented as:

$$\hat{s}_{ML} = \underset{s \in \Lambda}{\text{argmin}} \|y - Hs\|^2$$

$$= \underset{s \in \Lambda}{\text{argmin}} \{(s - \tilde{s}_{ZF})^H H^H H(s - \tilde{s}_{ZF})\}$$

$$= \underset{s \in \Lambda}{\text{argmin}} \{(s - \tilde{s}_{ZF})^H R^H R(s - \tilde{s}_{ZF})\}$$

$$= \underset{s \in \Lambda}{\text{argmin}} \|R(s - \tilde{s}_{ZF})\|^2.$$

R indicates an upper triangular matrix and is generated by QR decomposition or Cholesky factorization. An upper limit $r^2$ is defined to constrain the search range, such that $$\|R(s-\tilde{s}_{ZF})\|^2 = \sum_{m=1}^{M} r_{m,m}^2 \left|(s_m - \tilde{s}_{zf,m}) + \sum_{j=m+1}^{M} \frac{r_{m,j}}{r_{m,m}}(s_j - \tilde{s}_{zf,j})\right|^2 \le r^2.$$

As the equivalent formula of $\|R(s-\tilde{s}_{ZF})\|^2$ shown, the Euclidean distance (ED) is composed of M Euclidean distance increments (EDI)

$|e_m|^2$, where $$|e_m|^2 = r_{m,m}^2 \left|(s_m - \tilde{s}_{zf,m}) + \sum_{j=m+1}^{M} \frac{r_{m,j}}{r_{m,m}}(s_j - \tilde{s}_{zf,j})\right|^2.$$

The partial Euclidean distance (PED) of m-th layer is defined and represented as:

$$d_m = \sum_{i=m}^{M} r_{i,i}^2 \left|(s_i - \tilde{s}_{zf,i}) + \sum_{j=i+1}^{M} \frac{r_{i,j}}{r_{i,i}}(s_j - \tilde{s}_{zf,j})\right|^2$$

$$= d_{m+1} + |e_m|^2.$$

The $d_m$ merely associates with $[s_m, s_{m+1}, \ldots, s_M]$ and the SD search process can thus be converted to a recursive tree search structure, as shown in FIG. 3. Additionally, $\tilde{s}_{m|m+1}$ is defined based on Schnorr-Euchner (SE) enumeration and is represented as:

$$\tilde{s}_{m|m+1} = \begin{cases} \tilde{s}_{zf,m} - \frac{1}{r_{m,m}} \left(\sum_{j=m+1}^{M} r_{m,j}(s_j - \tilde{s}_{zf,j})\right), & m = 1, 2, \ldots, (M-1) \\ \tilde{s}_{zf,M}, & m = M. \end{cases}$$

When seeking the m-th layer, the SE enumeration first searches the signal node with minimum EDI: $\hat{s}_{m|m+1}$ ($\hat{s}_{m|m+1}$=slice($\tilde{s}_{m|m+1}$)) and then proceed with the other nodes around $\tilde{s}_{m|m+1}$ in a zigzag fashion. Thus, the enumeration guarantees that the signal node with smaller EDI can be preferentially visited, thereby accelerating the average seek speed.

As described, the traditional MLD is too complex to be implemented, and a sphere decoding (SD) method is introduced to reduce the complexity of MLD. Sphere decoding comprises depth-first search (DFS) and breadth-first search (BFS). With respect to the depth-first sphere decoding, the decoding latency varies much and may be quite long at lower SNR, which is not acceptable for real-time systems. Observing that the partial Euclidean distance (PED) in sphere decoding is increased monotonically with the search depth and the decoding efficiency depends largely on layer ordering, the invention tends to provide a modified sphere decoding method to mitigate the described defects.

BRIEF SUMMARY OF THE INVENTION

Maximum likelihood detection methods are provided. An exemplary embodiment of a maximum likelihood detection method comprises the following. Received data is processed to obtain preliminary parameters. An initial radius r is determined. $r^2$ is multiplied by a corresponding scaling factor according to a partial Euclidean distance (PED) constraint function to determine the upper limit values of PED for each layer. It is examined whether a sub-lattice exceeds a search scope according to the upper limit values of PED for each layer to search a better solution by utilizing the preliminary parameters.

Maximum likelihood detection systems are provided. An exemplary embodiment of a maximum likelihood detection system comprises a preprocessing unit, a configure unit, and a searching unit. The preprocessing unit processes received data to obtain preliminary parameters and determines an initial radius r. The searching unit multiplies $r^2$ by a corresponding scaling factor according to a partial Euclidean distance (PED) constraint function to obtain the upper limit values of PED for each layer and examines whether a sub-lattice exceeds a search scope according to the upper limit values of PED for each layer to search a better solution by utilizing the preliminary parameters.

Communication devices are provided. An exemplary embodiment of a communication device comprises a processing unit. The processing unit processes received data to obtain preliminary parameters, determines an initial radius r, multiplying $r^2$ by a corresponding scaling factor according to a predefined partial Euclidean distance (PED) constraint function to obtain upper limit values of PED for each layer, and examines whether a sub-lattice exceeds a search scope according to the upper limit values of PED for each layer to search a better solution by utilizing the preliminary parameters.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 is a schematic view of pseudo codes for reducing total search paths;

DETAILED DESCRIPTION OF THE INVENTION

Figure 6:
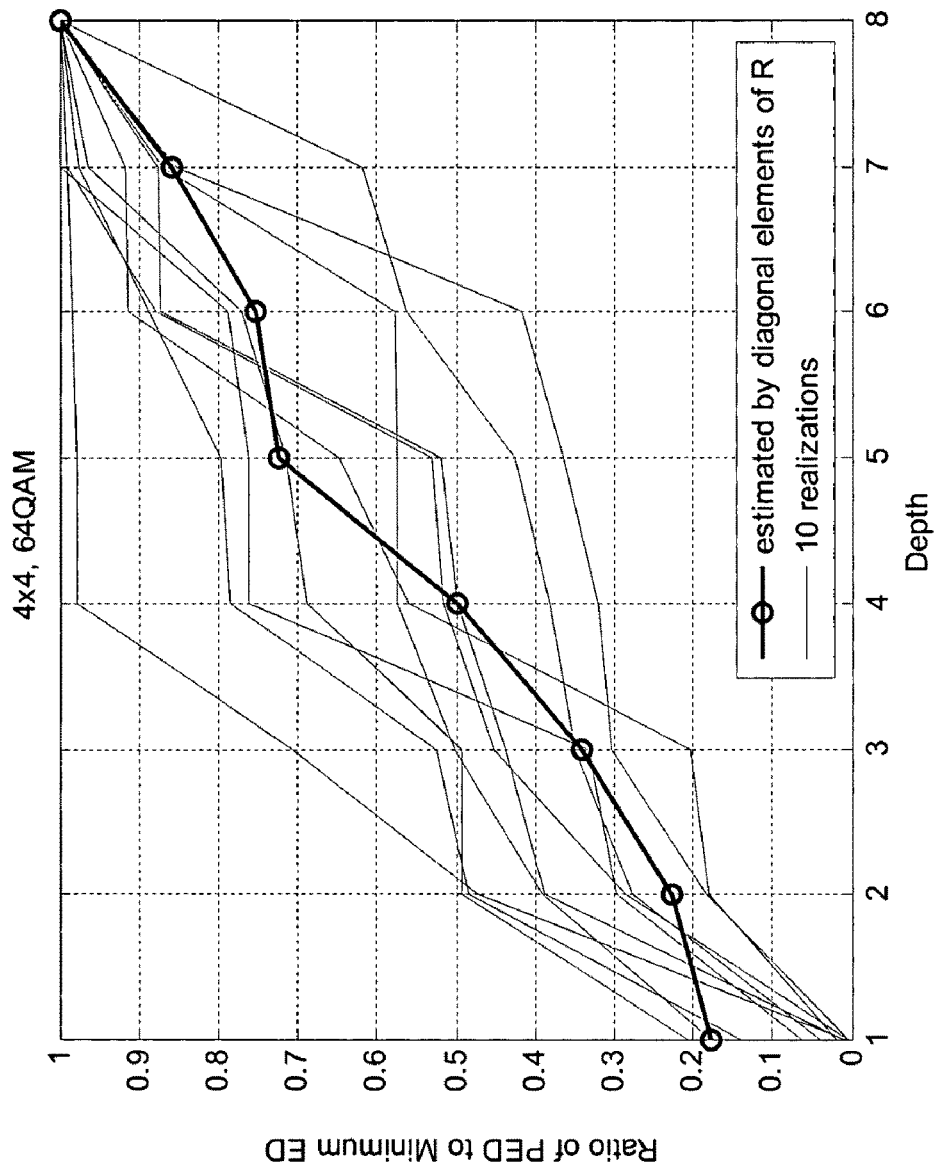
FIG. 6 is a schematic view of the Euclidean distance increment (EDI)

Several exemplary embodiments of the invention are described with reference to FIGS. 4 through 6, which generally relate to maximum likelihood detection. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a maximum likelihood detection (MLD) method and system.

The sphere decoding is introduced to MIMO technology to reduce the complexity of MLD. The sphere decoding first defines a logical sphere radius and merely searches those lattice points within the sphere. Referring to the H matrix described above, if the column vectors are properly interchanged (i.e. exchange indexes of transmit antennas), the decoding complexity and search latency could be substantially reduced.

Alternatively, if the defined sphere contains fewer lattice points, potentially resulting from a shorter sphere radius, the search speed is faster. Additionally, the partial Euclidean distance (PED) of a search path is monotonically increased with tree depth. Thus, the partial Euclidean distance (PED) of a candidate sub-lattice point (residing at several contiguous upper layers) is definitely smaller than $r^2$, that is, the search space for a lower dimension sub-lattice could be limited within a smaller sphere to accelerate the search speed.

Figure 1:
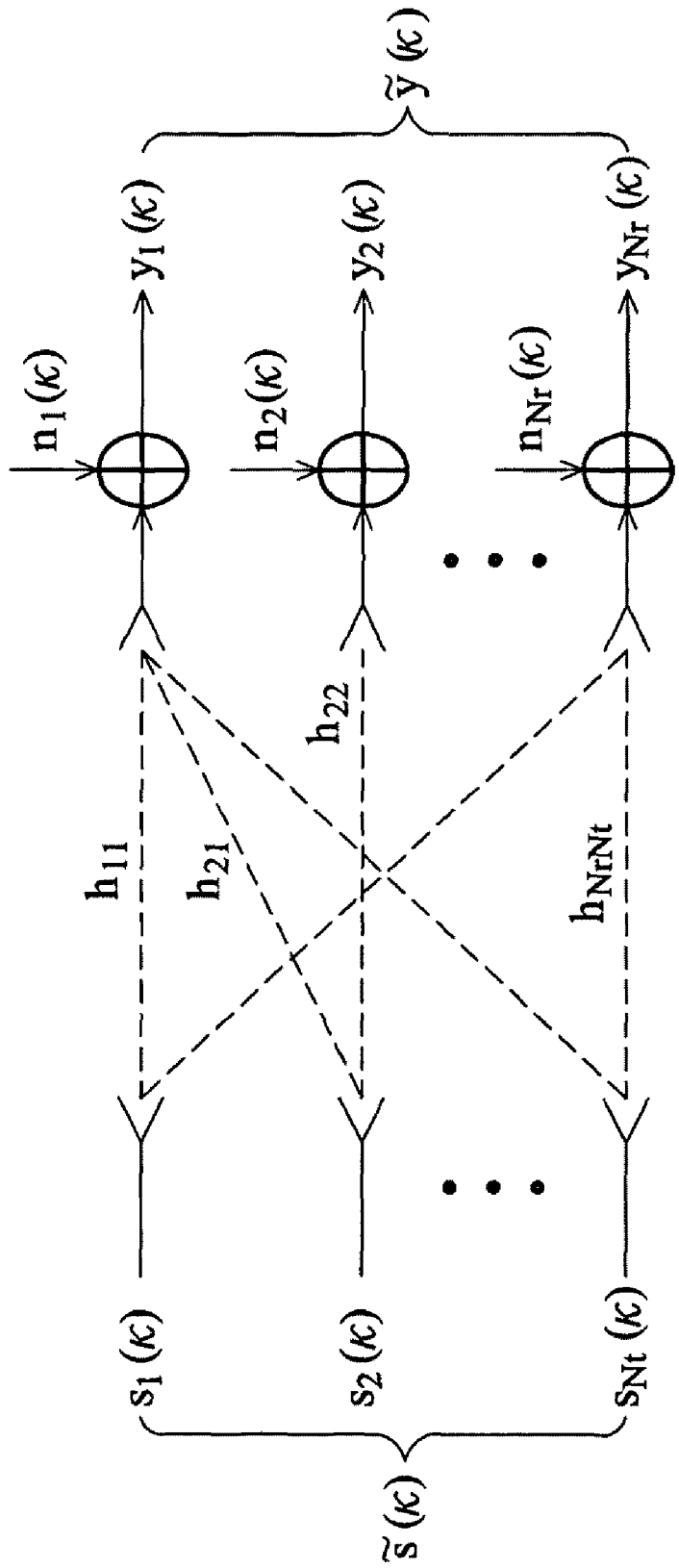
FIG. 1 is a schematic view of a typical MIMO data model.
Figure 2:
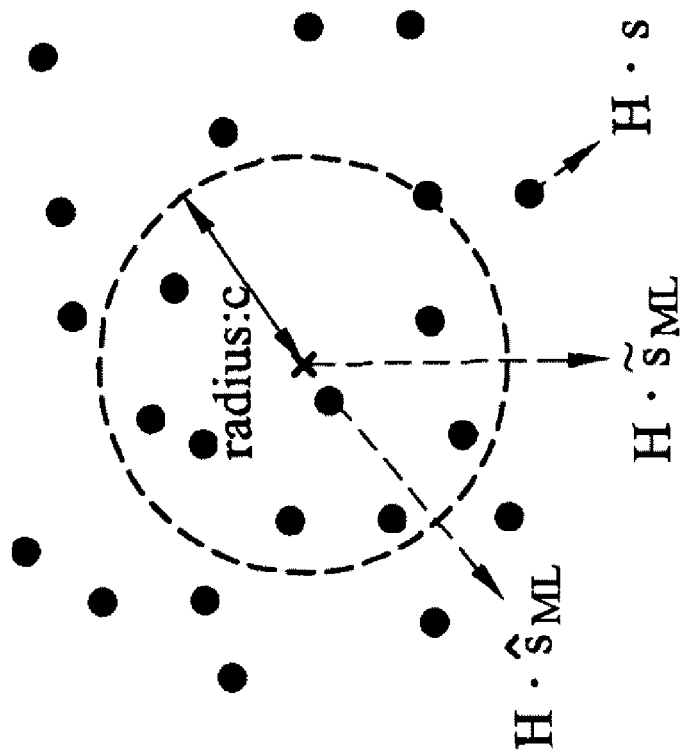
FIG. 2 is a schematic view of a sphere decoding.
Figure 3:
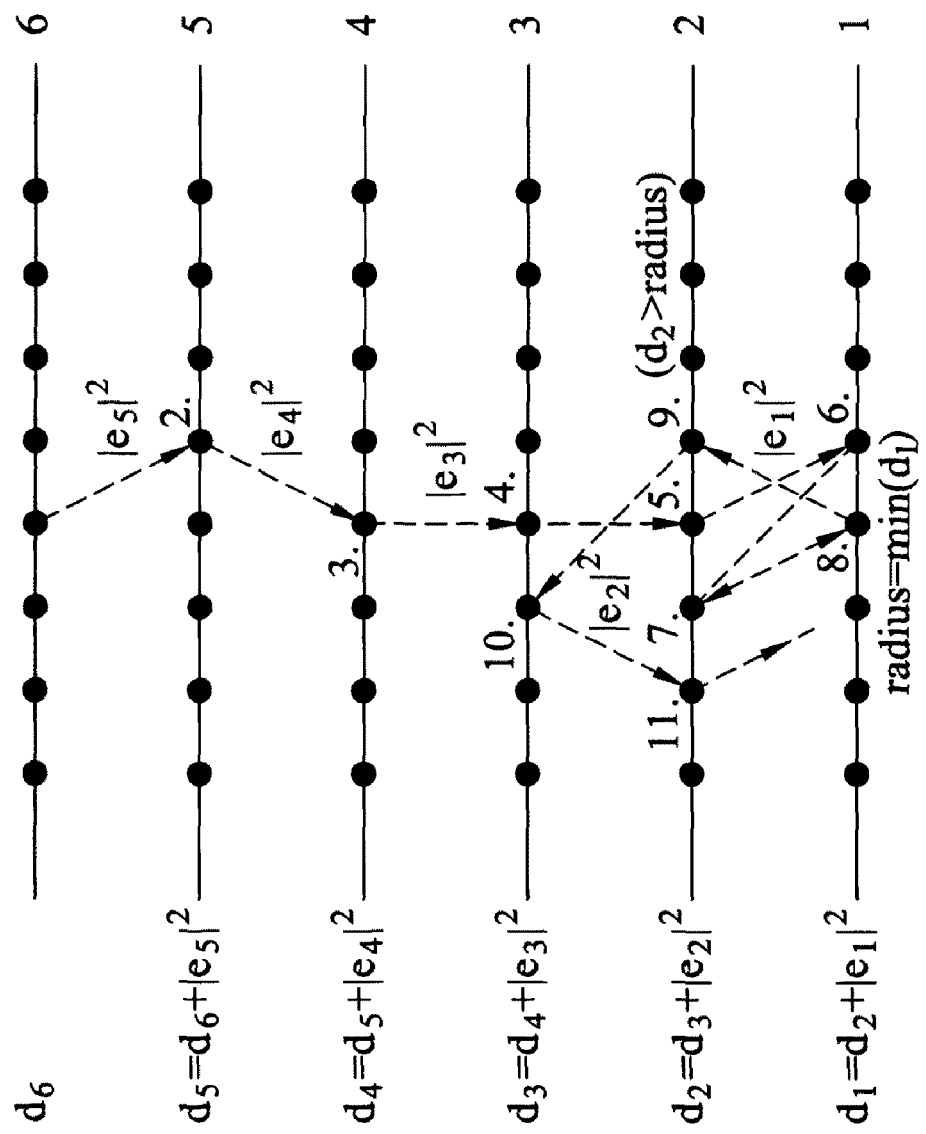
FIG. 3 is a schematic view of a depth-first search (DFS)

Efficient search can be achieved using the depth-first search combining the Schnorr-Euchner (SE) enumeration method that preferentially visits a child node which results in the smallest Euclidean distance increment (EDI) for each layer. When the bottom layer is achieved, a currently retrieved Euclidean distance serves as a constraint radius r and $r^2$ is obtained. Once the PED of a layer is greater than $r^2$, the down search is stopped, and it turns back to the upper layer to locate a parent node that has the smallest PED among those unexplored neighboring nodes and proceeds with depth-first searching, as shown in FIG. 3.

With respect to the depth-first search (DFS), when a lattice point closer to the sphere center is located, a new sphere radius is updated and replaced by the distance between the center of the sphere and the lattice point. Based on the tree-search behavior in the sphere decoding, if one search path can be terminated (due to exceeding the constraint radius) at an upper layer, more following paths associated with it will be discarded, implying computation power can be reduced more. In other words, if a signal node at an upper layer can be excluded from the search tree, the number of total required search paths will be significantly decreased. Thus, an embodiment of a maximum likelihood detection (MLD) method is provided to exploit the described observations.

Figure 4:
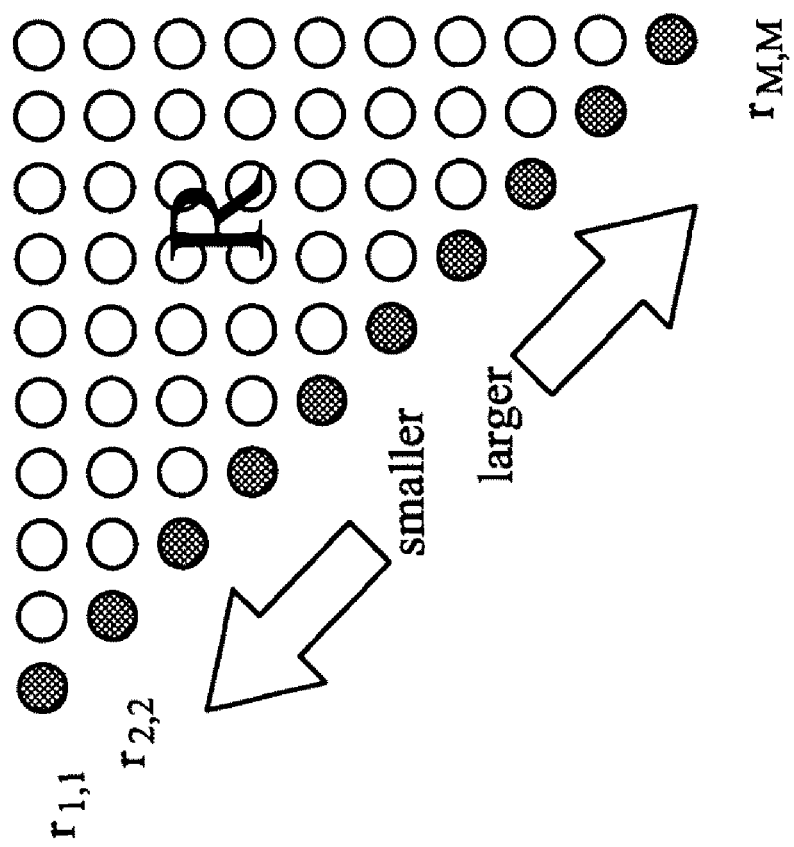
FIG. 4 is a schematic view of an upper-triangular matrix intended to be generated by QR-decomposition or Cholesky factorization with layer ordering.

The diagonal elements of the upper triangular matrix R are sorted during the QR-decomposition for a sphere decoding to make the lower-right diagonal elements as large as possible, as shown in FIG. 4. An upper layer of a search tree is associated with a lower-right diagonal element of R. Since $$|e_m^2| = r_{m,m}^2 \left| (s_m - \tilde{s}_{zf,m}) + \sum_{j=m+1}^{M} \frac{r_{m,j}}{r_{m,m}} (s_j - \tilde{s}_{zf,j}) \right|^2, \text{ and}$$

$$d_m = \sum_{i=m}^{M} |e_i|^2,$$

enlarging lower-right diagonal elements ($r_{m,m}^2$) of R may obtain a larger partial Euclidean distance (PED) at the upper layers. Thus, a search path (rooted in the top layer) tends to exceed a sphere radius at the upper layer, that is, all the subsequent search paths associated with it can be early terminated.

Furthermore, since the partial Euclidean distance (PED) of a search path is monotonically increased with search depth, a smaller sub-sphere radius can be defined to constrain the partial Euclidean distance (PED) at the upper layers. Thus, the search span at the upper layers can be effectively shortened.

To obtain the desired form of R, a conventional method that reorders the columns of H based on column norm values is widely used. A column with a smaller norm is located at the leftmost side of matrix H. An improved method based on "Efficient algorithm for decoding layered space-time codes" disclosed by D. Wubben, R. Bohnke, J. Rinas, V. Kuhn, and K. D. Kammeyer, IEEE Electronics Letters, vol. 37, pp. 1348-1350, October 2001, can satisfy the requirement of R and guarantee that the element $r_{M,M}^2$ will be the maximum among all possible ordering.

To achieve the goal of reducing total search paths, a conventional method is disclosed and pseudo codes thereof are shown in FIG. 5. Referring to FIG. 5, the radius constraint on partial Euclidean distance (PED) of each layer is adjusted according to a modification term $F_k$ to make the upper layer obtain a smaller sphere radius. The increment of the modification term ($F_{k+1}-F_k$) is proportional to noise power and the diagonal element $r_{k,k}$ of matrix R, and the noise power should be estimated in advance. The Euclidean distance increment (EDI) is not adequately proportional to $r_{k,k}$ in reality, as shown in FIG. 6. Furthermore, during a depth-first search (DFS) process, $r^2$ is gradually reduced but the modification term $F_k$ does not adjust accordingly.

Thus, an embodiment of a maximum likelihood detection (MLD) method imposes a smaller sub-sphere (or a smaller radius constraint) to a smaller dimension sub-lattice according to a distribution function. The distribution function can be predefined or adjusted according to the present channel condition. Since the sphere radius shrinks once a better solution is found, the sub-sphere corresponding to the sub-lattice shrinks accordingly.

Figure 7:
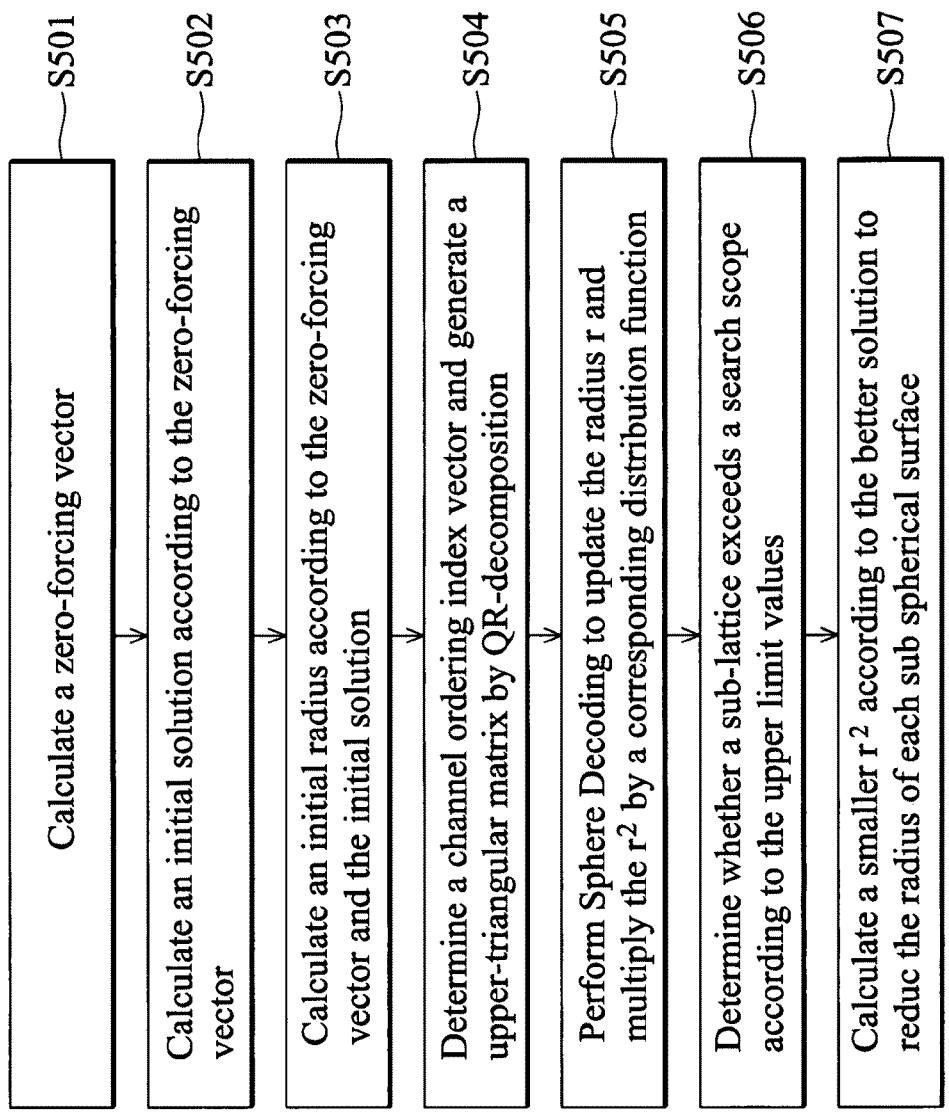
FIG. 7 is a flowchart of the invented maximum likelihood detection method.

FIG. 7 is a flowchart of the invented maximum likelihood detection method based on a sphere decoding method.

Figure 18:
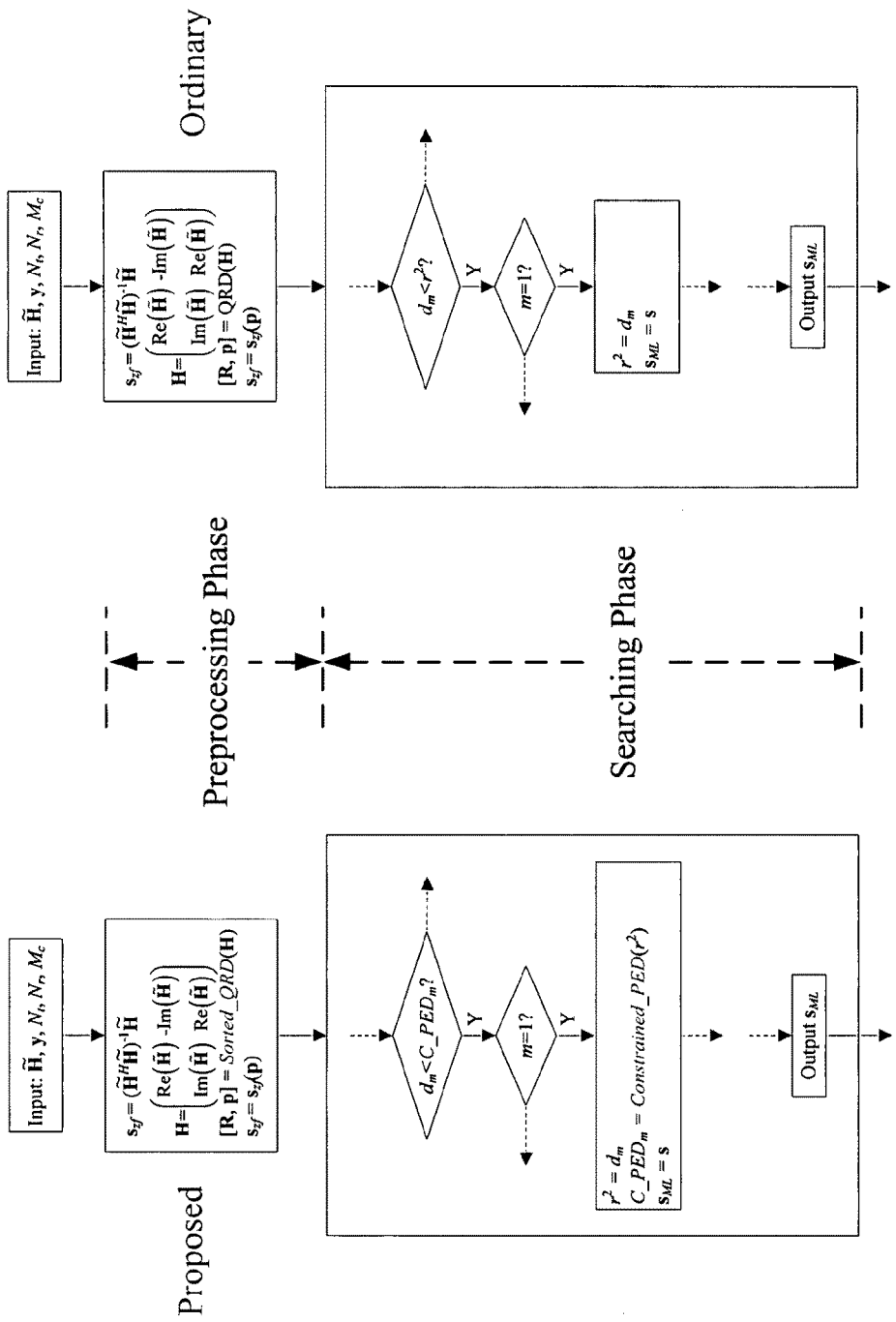
FIG. 18 is a schematic view of the difference between conventional methods and the invention.

The difference between conventional methods and the invention is shown in FIG. 18, of which further description is not provided.

An exemplary embodiment of a maximum likelihood detection (MLD) is described in the following.

Figure 8:
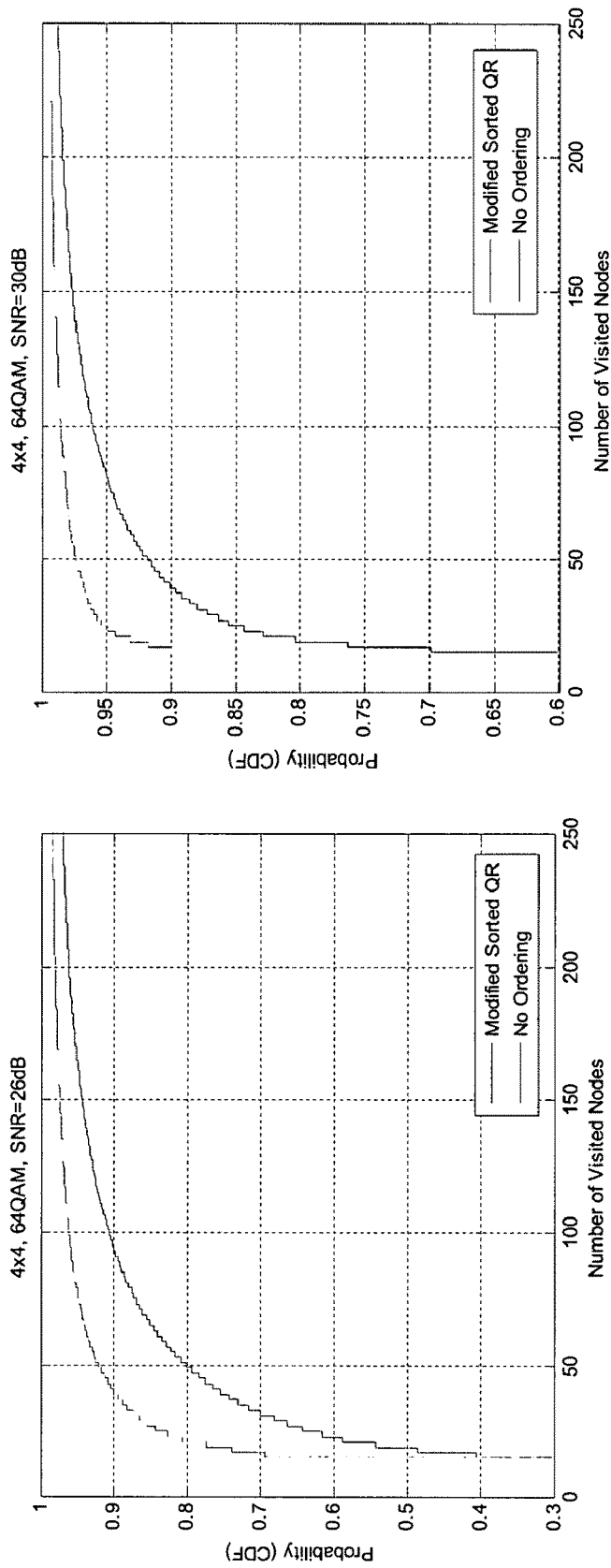
FIG. 8 is a schematic view of improvement of decoding latency.
Figure 19:
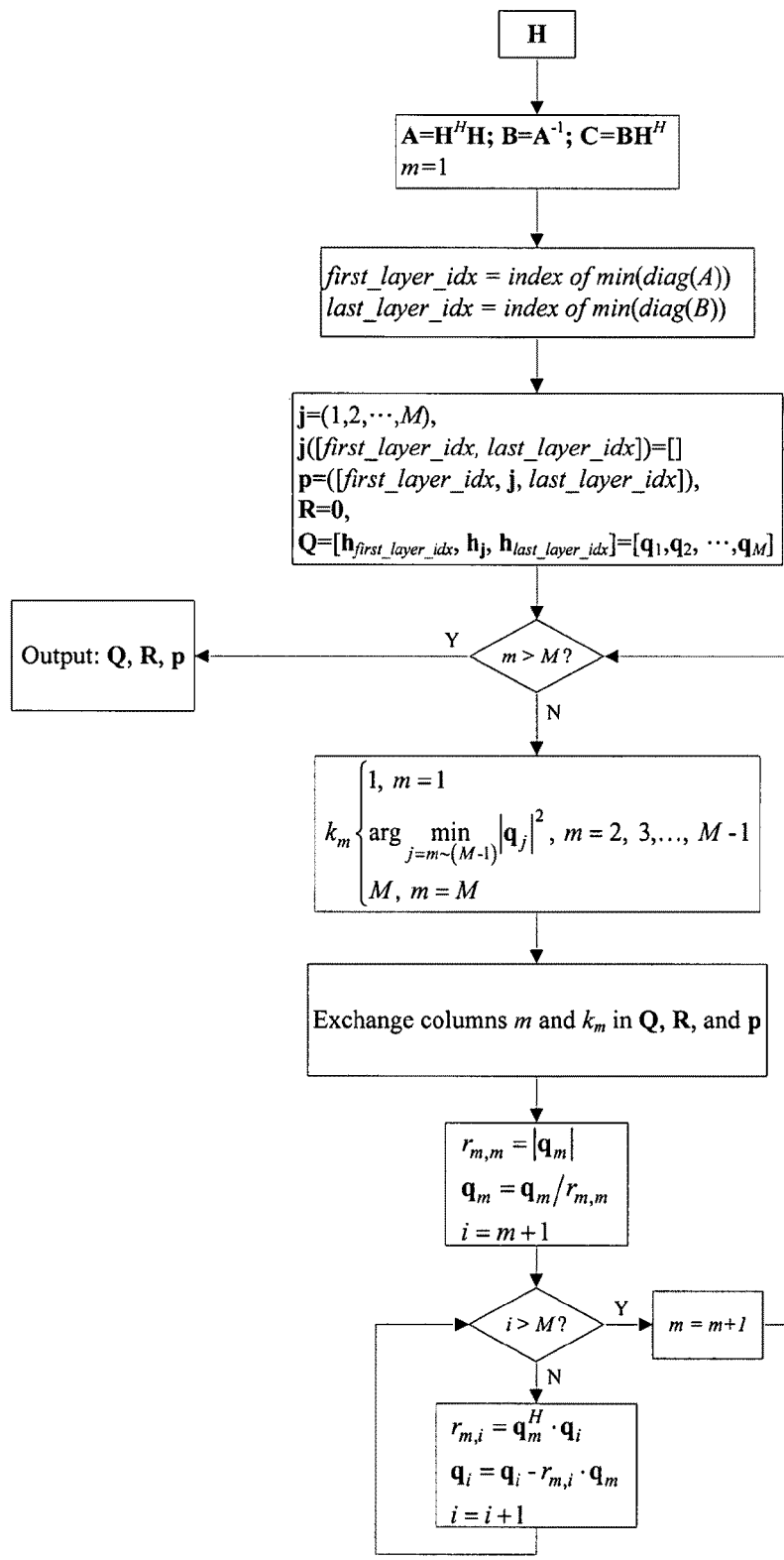
FIG. 19 is a schematic view of a method for determining a channel ordering index vector and generating an upper-triangular matrix R.

When a tree search based sphere decoding is applied for maximum likelihood detection (MLD), a zero-forcing vector $\tilde{s}_{ZF}$ is first calculated by $\tilde{s}_{ZF}=(\tilde{H}^H\tilde{H})^{-1}\tilde{H}^H\tilde{y}$ (step S501). When $N_t=N_r$ and $\tilde{H}$ represents a full rank matrix, $\tilde{s}_{ZF}=\tilde{H}^{-1}\tilde{y}$. A hard decision is applied to $\tilde{s}_{ZF}$ to obtain an initial solution $\hat{s}_{ZF}$=slice ($\tilde{s}_{ZF}$) (step S502). As described, in the depth-first search (DFS), the initial radius r can be obtained from $\|H(\hat{s}_{ZF}-\tilde{s}_{ZF})\|$ or from the Euclidean distance (ED) of the first candidate solution (step S503). Additionally, a channel ordering index vector is determined and an upper-triangular matrix R could be generated using a process shown in FIG. 19 to enable $H^HH=R^HR$ (step S504), where H is column-ordered according to the channel ordering index vector. The QR-decomposition process shown in FIG. 19 is well known and is not further described herein. With respect to the upper-triangular matrix R, diagonal elements of R tend to be greater than that of the unordered one, such that decoding latency is improved, as shown in FIG. 8.

Next, a PED constraint function is obtained, and it is examined whether a sub-lattice exceeds a search scope according to the upper limit values of partial Euclidean distance (PED) for each layer to search a better solution. The sphere decoding is performed to update the radius r. Whenever an updated $r^2$ is obtained from a better solution, it is multiplied by a corresponding function value according to a PED constraint function "constraint_function(m)" to obtain the upper limit values of PED for each layer (the constraint value of each layer indicates the sub-sphere radius imposed on the sub-lattice of each corresponding dimension) (step S505). Next, the sub-lattice is checked to see if it exceeds the search scope according to the upper limit value of partial Euclidean distance (PED) for each layer based on a formula (step S506), represented as:

$$d_m = \sum_{i=m}^{M} r_{i,i}^2 \left| (s_i - \tilde{s}_{zf,i}) + \sum_{j=i+1}^{M} \frac{r_{i,j}}{r_{i,i}} (s_j - \tilde{s}_{zf,j}) \right|^2$$
$$= d_{m+1} + |e_m|^2$$
$$\leq r^2 \cdot \text{constraint\_function}(m).$$

Figure 9:
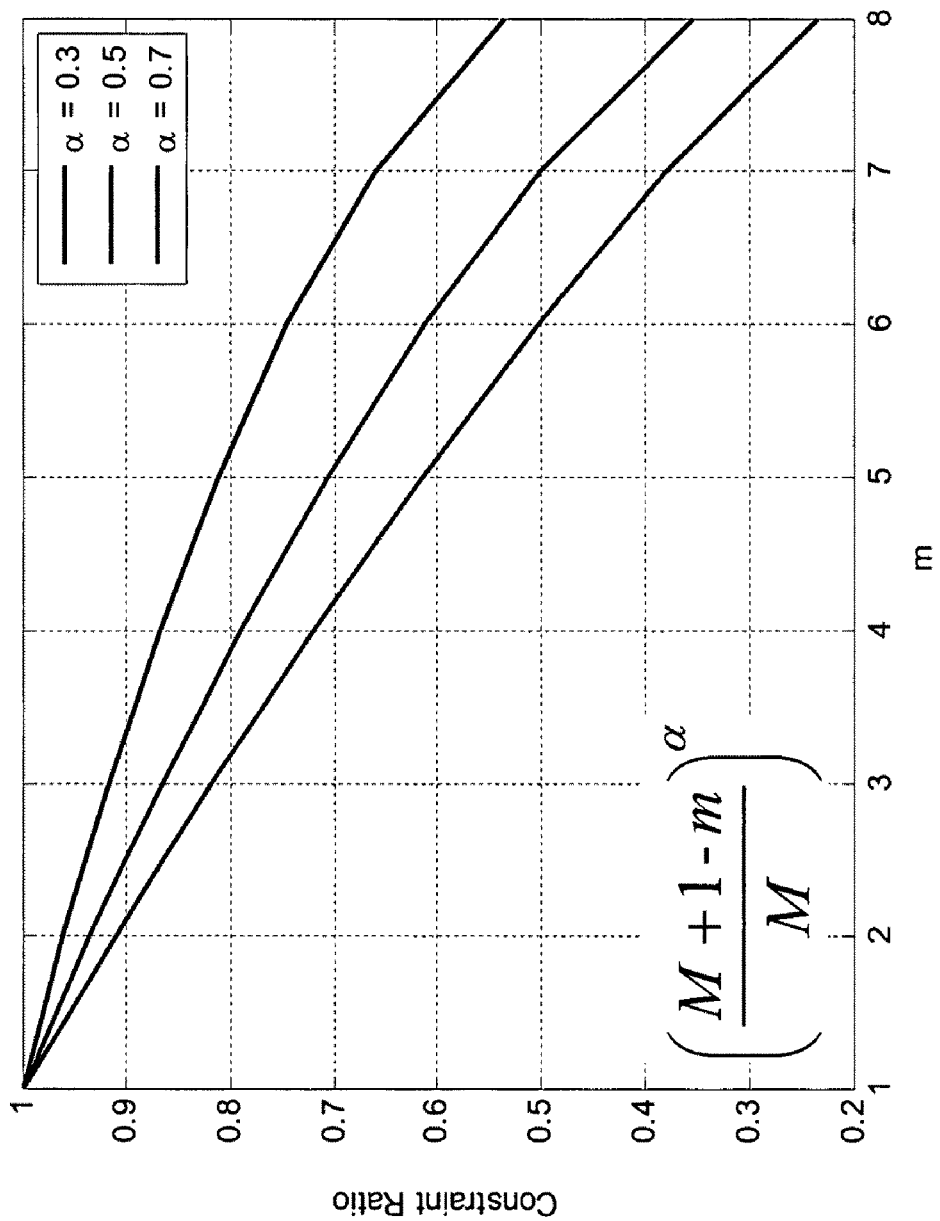
FIG. 9 is a schematic view of an exemplary constraint function.

An exemplary constraint function is shown in FIG. 9. When a better solution is found, a smaller $r^2$ can also be obtained, such that the radius of each sub spherical surface is also reduced (step S507).

An embodiment of the invention related to maximum likelihood detection (MLD) determines the layer ordering of the search tree and searches nodes according to a cost function and a distribution function to prevent unnecessary searching.

The layer ordering of the search tree is determined by the by-product of the zero-forcing matrix and a sorting procedure in the QR-decomposition. The cost function represents the distance from a lattice point to a sphere center. The distribution function helps reduce the search span for lower-dimension sub-lattice. Additionally, the distribution function can be a monotonically increasing function or any function that outputs values not greater than one.

Figure 10:
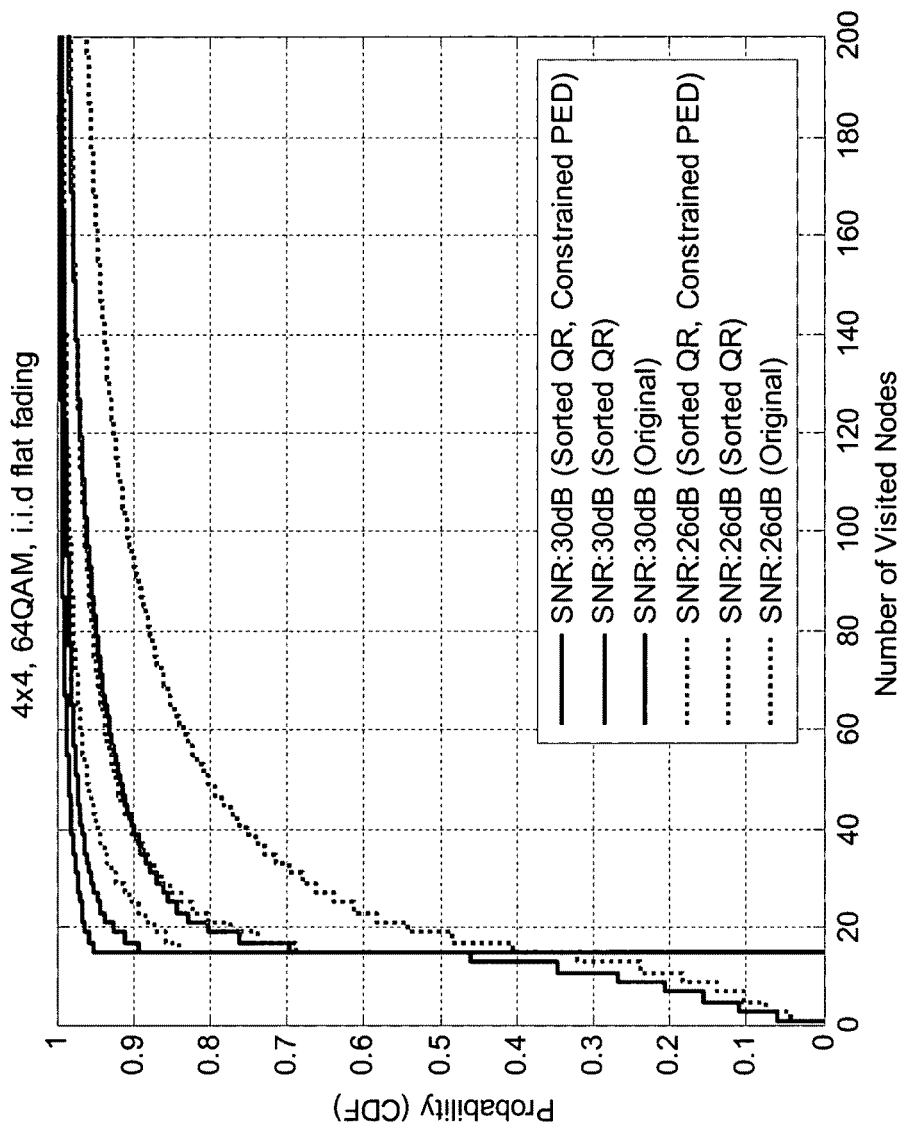
FIG. 10 is a schematic view of higher potential for completing a search process.
Figure 11:
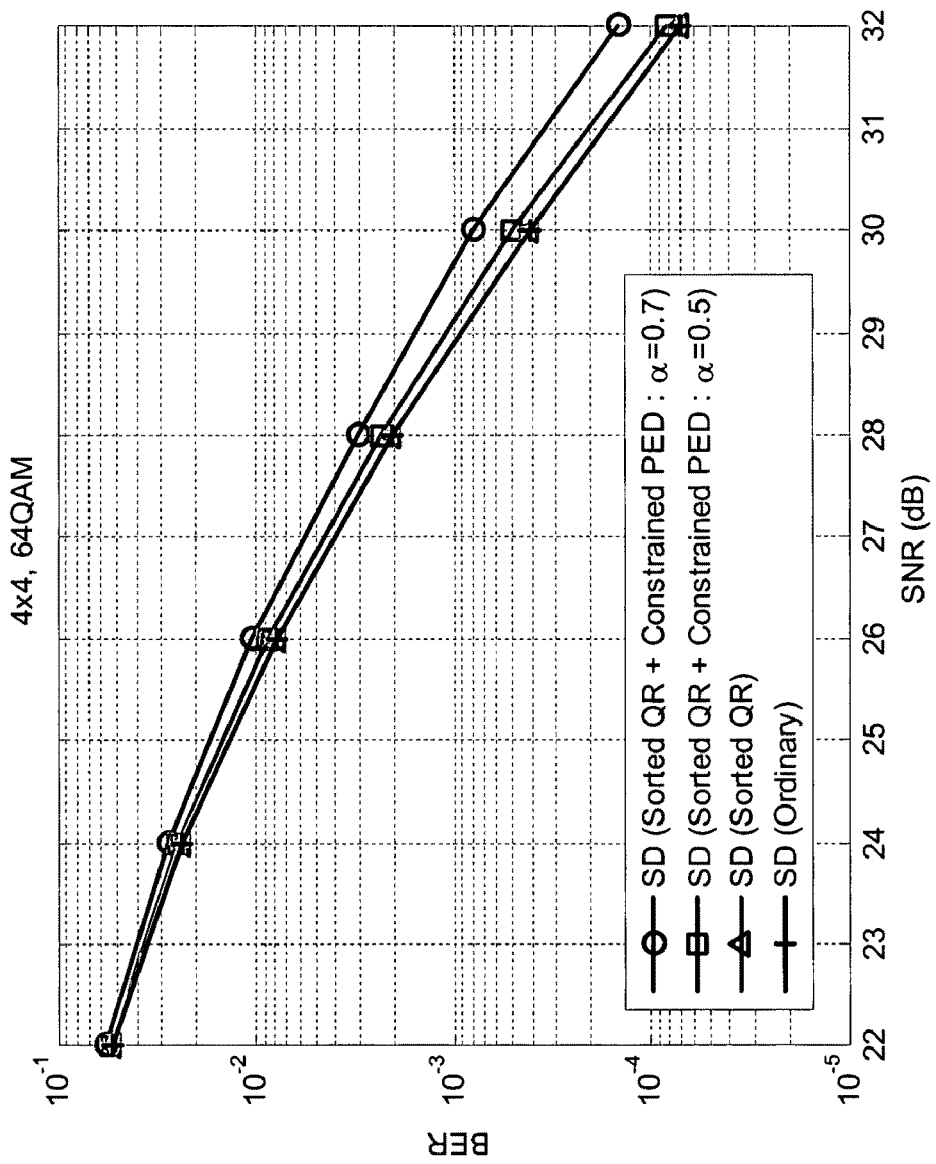
FIG. 11-14 are schematic views of a little degradation for 64-quadrature amplitude modulation (64-QAM) with a 4×4 case.
Figure 12:
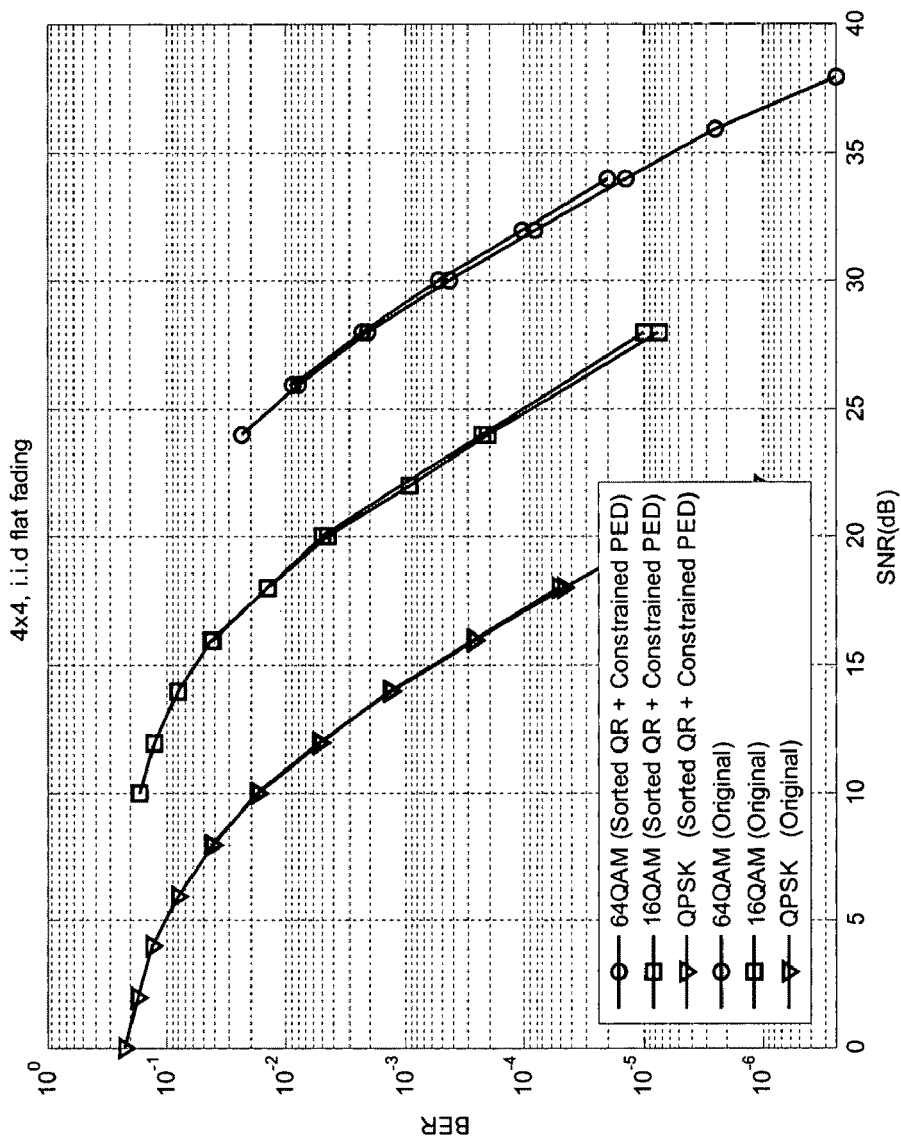
Figure 13:
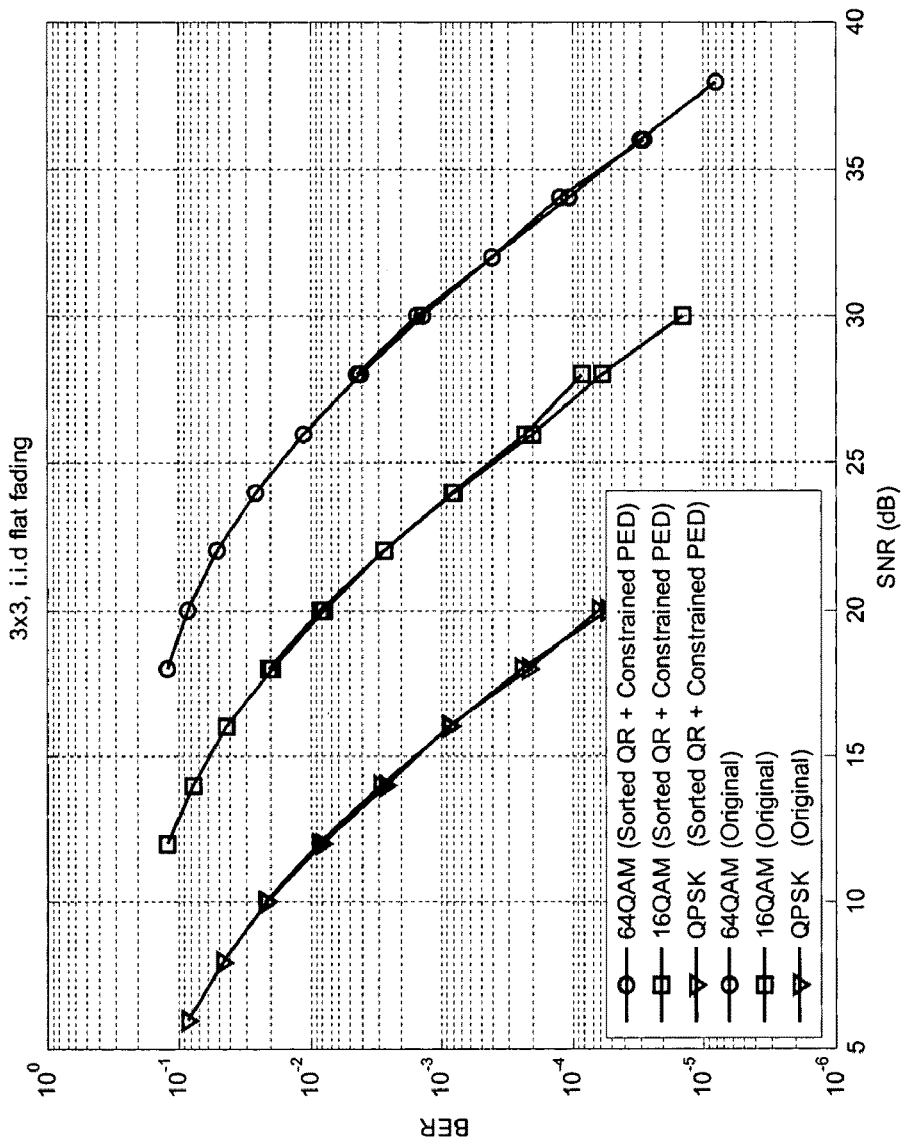
Figure 14:
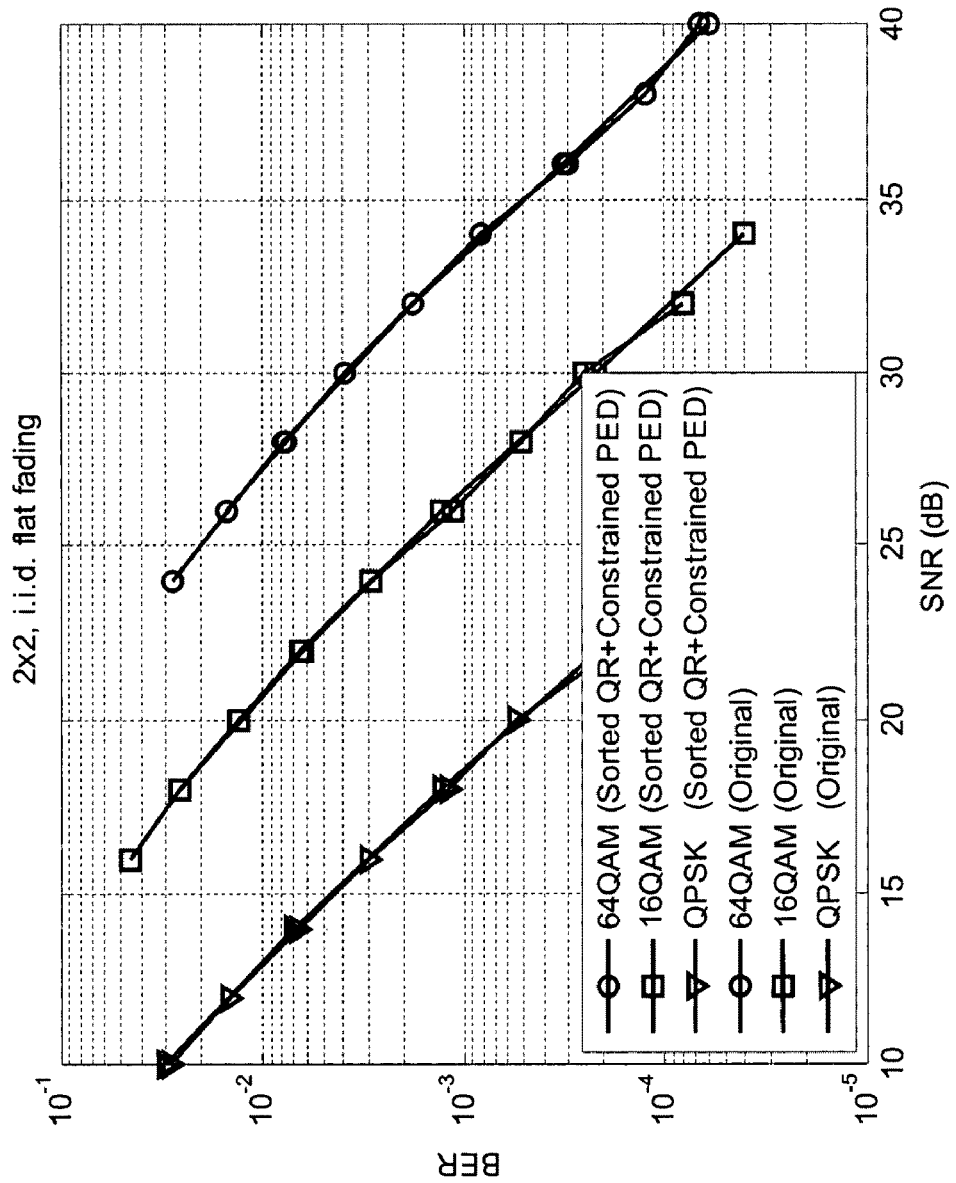
Figure 15:
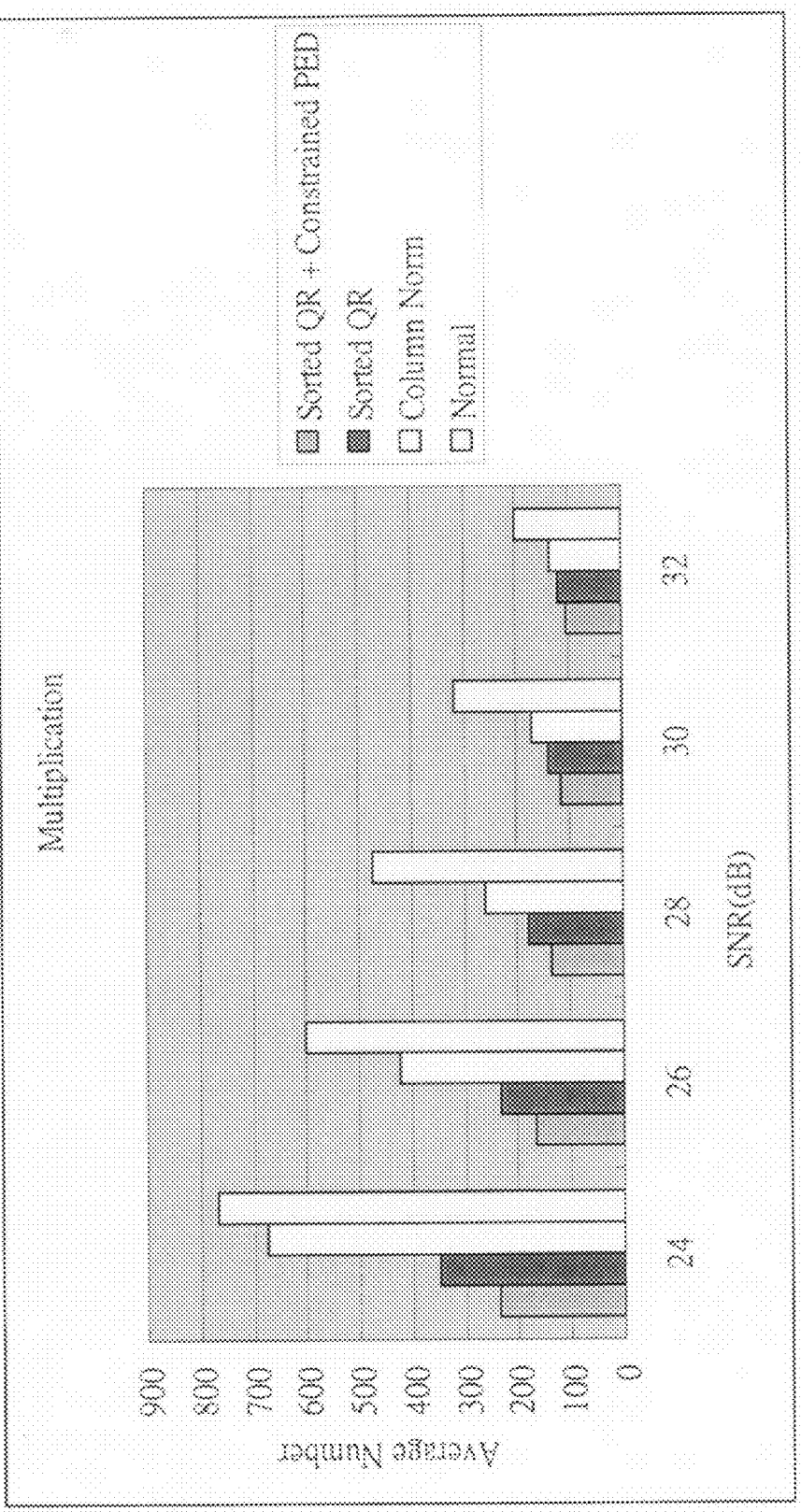
FIG. 15-17 are schematic views of substantially reducing the complexity using the method of the invention.
Figure 16:
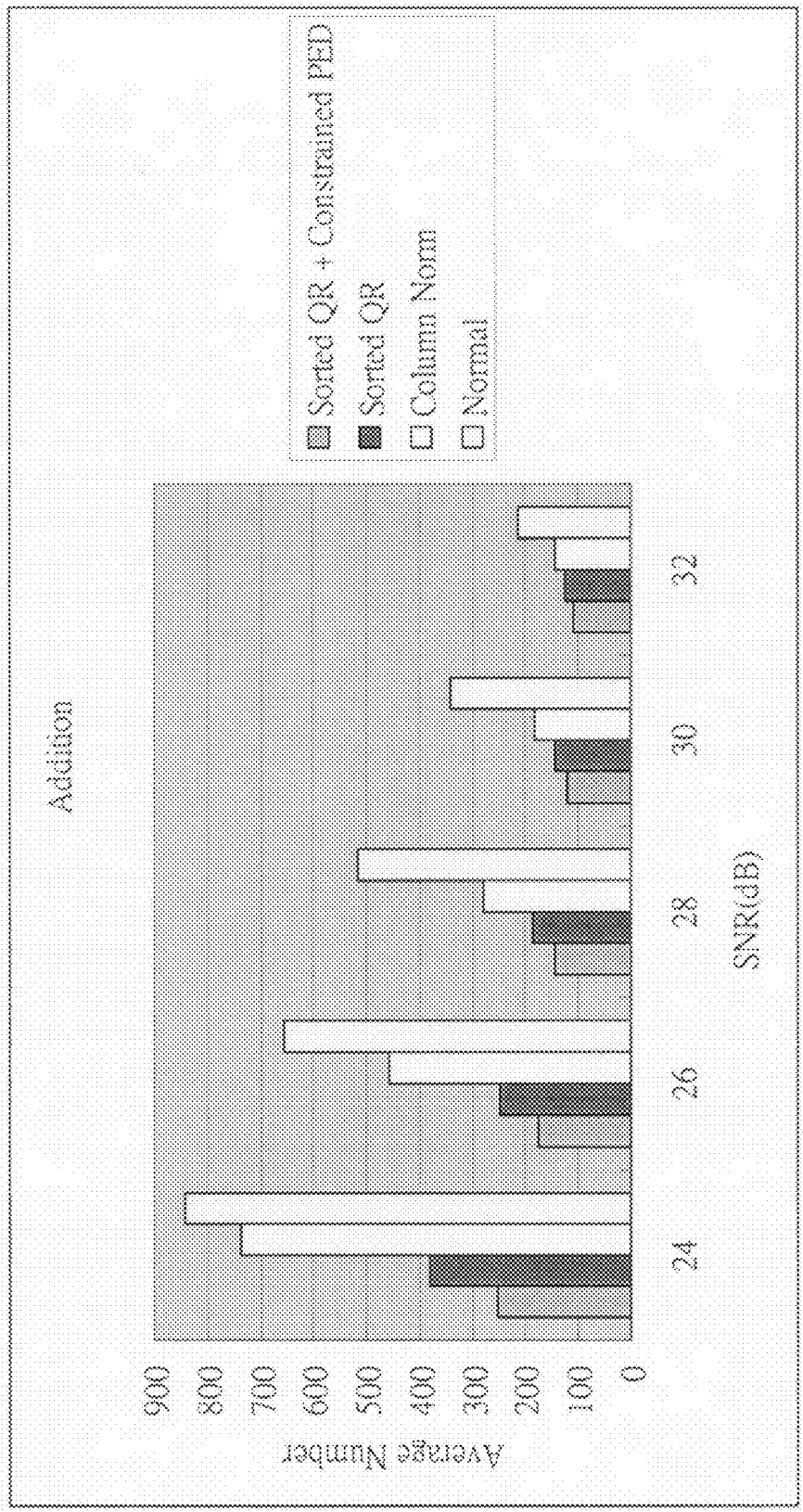
Figure 17:
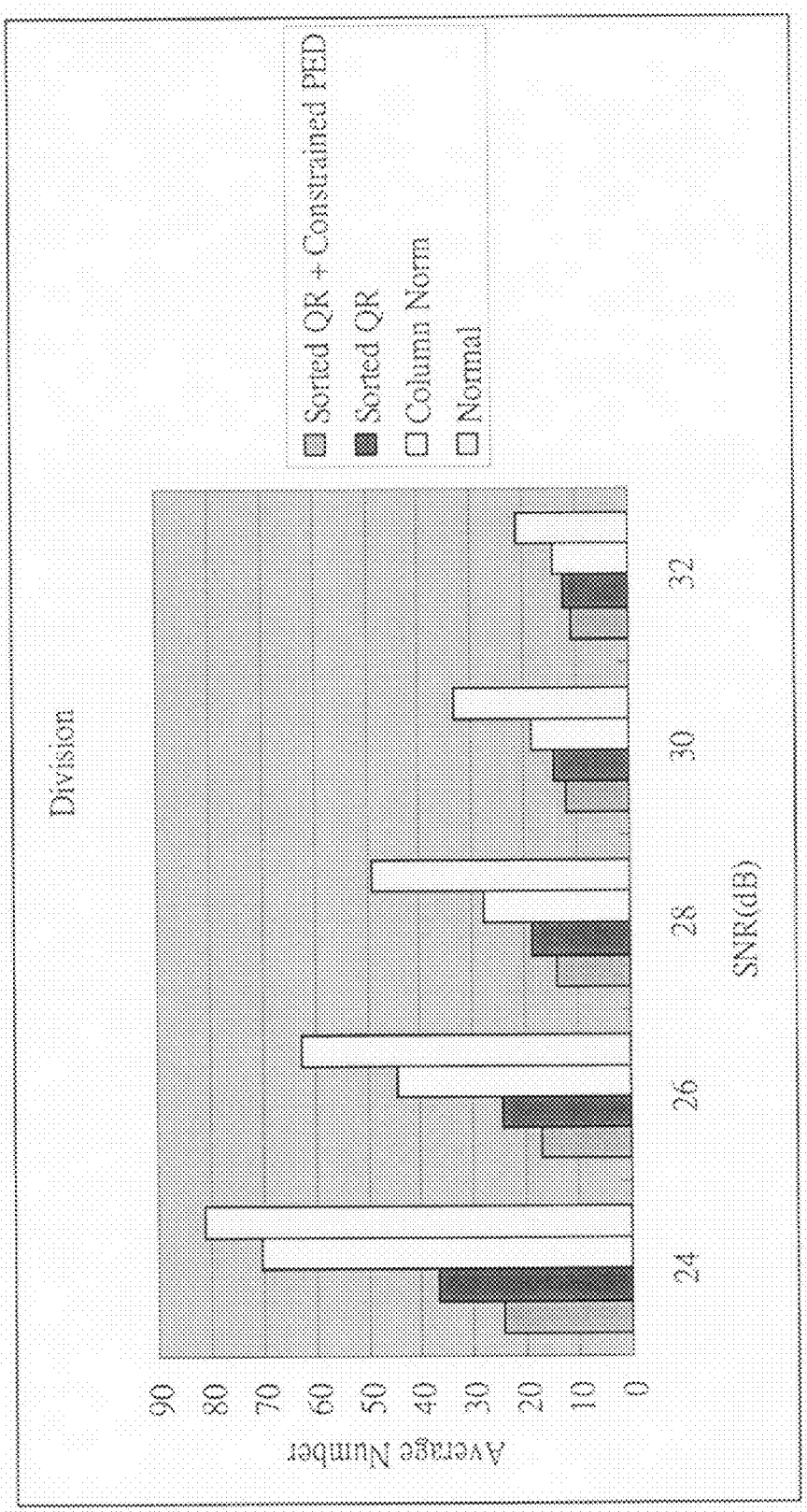

An embodiment of the invention related to maximum likelihood detection (MLD) substantially improves the decoding latency. For a given decoding latency limit, the invention has higher potential for completing a search process, as shown in FIG. 10. For 2×2 and 3×3 cases, the bit error rate (BER) performance matches well to the ideal curve. For a 4×4 case, only 64-quadrature amplitude modulation (64-QAM) exhibits a little degradation, as shown in FIG. 11-14. Additionally, the complexity is substantially reduced by the invention, as shown in FIG. 15-17.

Figure 20:
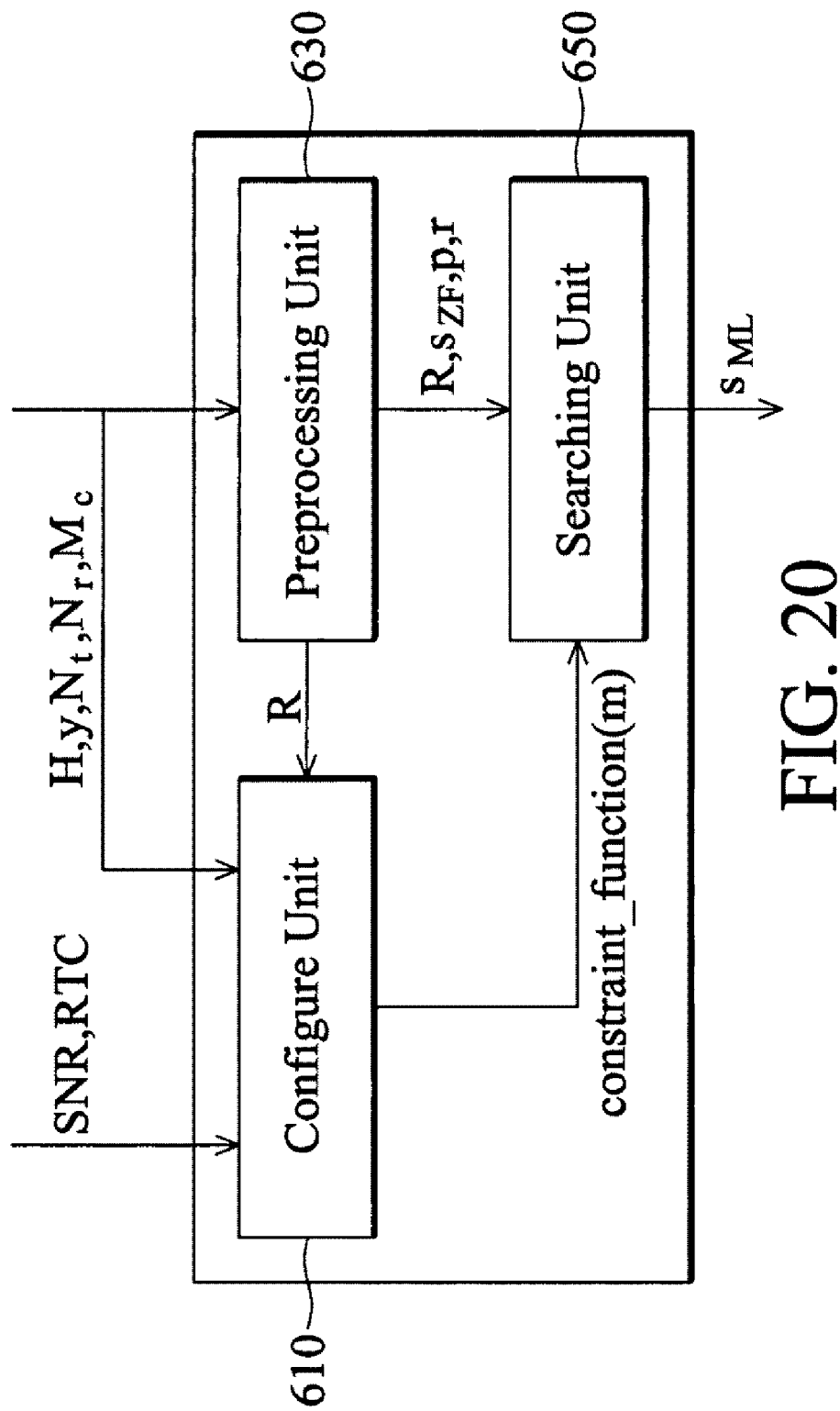
FIG. 20 is a schematic view of an embodiment of a maximum likelihood detection system using the invented maximum likelihood detection method.

FIG. 20 is a schematic view of an embodiment of a maximum likelihood detection system using a sphere decoding method.

The system comprises a configure unit 610, a preprocessing unit 630, and a searching unit 650. Configure unit 610 obtains system parameters comprising SNR, RTC, $N_t$, $N_r$, $M_c$, and the like to decide a constraint function imposed on each layer. Preprocessing unit 630 calculates an initial solution and an initial radius according to the zero-forcing vector, generates an upper-triangular matrix by QR-decomposition, and obtains an ordering index vector. The searching unit 650 searches a better solution to update the sphere radius r and multiplies $r^2$ by a corresponding scaling factor according to the partial Euclidean distance (PED) constraint function to obtain upper limit values of PED for each layer and uses the upper limit values to examine whether a sub-lattice exceeds a search scope. A better solution leading to a smaller $r^2$ will help to reduce the radius of each sub spherical surface for the following search.

Furthermore, a detailed process for layer ordering is described as follows.

During the process of calculating a zero-forcing solution ($\tilde{s}_{ZF} = (H^H H)^{-1} H^H y$), the first and last column indexes can be determined. The first column is selected according to the index of the smallest diagonal component of $H^H H$, which is, for example, represented as:

$$H^H H = \begin{bmatrix} 12.6278 & 4.4504 - 4.9968i & -2.4224 - 0.9386i & -1.6446 + 0.6661i \\ 4.4504 + 4.9968i & 12.4287 & 3.7209 - 4.1172i & 0.9654 - 4.4531i \\ -2.4224 + 0.9386i & 3.7209 + 4.1172i & 5.0783 & 2.8153 - 1.9356i \\ -1.6446 - 0.6661i & 0.9654 + 4.4531i & 2.8153 + 1.9356i & 4.4262 \end{bmatrix}.$$

The diagonal component 4.4262 is the smallest one and its corresponding index is 4, so the fourth column of H is selected to be the first column of the reordered H (first_layer_idx=4). Next, $$(H^H H)^{-1} = \begin{bmatrix} 0.194 & -0.1795 + 0.0784i & 0.1166 - 0.1116i & 0.0070 - 0.1048i \\ -0.1795 - 0.0784i & 0.3646 & -0.2322 + 0.1728i & -0.0858 + 0.1532i \\ 0.1166 + 0.1116i & -0.2322 - 0.1728i & 0.6632 & -0.1372 + 0.1180i \\ 0.0070 + 0.1048i & -0.0858 - 0.1532i & -0.1372 - 0.1180i & 0.5560 \end{bmatrix}.$$

The diagonal component 0.194 is the smallest one and its corresponding index is 1, so the first column of H is selected to be the last column of the reordered H (last_layer_idx=1). It is noted that when selecting the smallest diagonal component of $H^H H$ or $(H^H H)^{-1}$, a duplicate may exist. In this case, any one of which can be selected. By such ordering, the top-left diagonal component of R is the smallest while the bottom-right one is the greatest among all possible orderings.

When the first and last column vectors are determined, a sorted QR decomposition is applied to determine the orders of the remaining layers, in which a modified Gram-Schmidth Householder or Givens Rotation procedure and a sorting process may be implemented to enable R with larger lower-right diagonal components. Thus, sub-lattice resident in upper layers accumulates to a larger PED value and hence easily exceeds the spherical surface. That is, the unsatisfactory signal combinations are reasonably dropped.

Next, a hard decision is applied to $\tilde{s}_{ZF}$ and an initial solution $\hat{s}_{ZF}$=slice($\tilde{s}_{ZF}$) is generated. With respect to the depth-first search (DFS), $\|H(\hat{s}_{ZF}-\tilde{s}_{ZF})\|$ can serve as an initial radius r or the radius r can also be determined by ED when the bottom layer is achieved. Thus, an initial radius r of a sphere, an upper triangular matrix R, an ordering index vector p of channel columns, and a zero-forcing vector $\tilde{s}_{ZF}$ are obtained in the pre-processing stage.

The sphere decoding (SD) indicates a tree search process, in which a sub-lattice of dimension n represents all possible node combinations residing in the top n layers of the tree. The SE enumeration method allows a node residing in a lower layer which leads to a smallest increment of PED to be visited first. A node residing in the m-th layer and resulting to the smallest increment of PED is defined as $\hat{s}_{m|m+1}$=slice($\tilde{s}_{m|m+1}$), in which $$\tilde{s}_{m|m+1} = \begin{cases} \tilde{s}_{zf,m} - \frac{1}{r_{m,m}}\left(\sum_{j=m+1}^{M} r_{m,j}(s_j - \tilde{s}_{zf,j})\right), & m = 1, 2, \ldots, (M-1) \\ \tilde{s}_{zf,M}, & m = M. \end{cases}$$

When the bottom layer is achieved, an initial (or updated) radius r is obtained. Thus, the predefined constraint function is applied to shorten the search span of each layer, such that the sub-lattice of smaller dimension will be equivalently restricted within a smaller sphere.

It is noted that the constraint radius for each layer can be updated when a smaller $r^2$ is obtained. Additionally, the predefined constraint function can also be dynamically adjusted.

An embodiment of the method can also be applied to a communication device (not shown). The communication device comprises a processing unit (not shown) performing the maximum likelihood detection method. Further, the communication device may be a mobile station, a base station, an access point, a portable device, or a desktop, while the processing unit may be a digital signal processing (DSP) unit or an application specific integrated circuit (ASIC).

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A maximum likelihood detection method, comprising:
   processing received data to obtain preliminary parameters;
   determining an initial radius r;
   multiplying $r^2$ by a corresponding scaling factor according to a partial Euclidean distance (PED) constraint function to determine the upper limit values of PED for each layer; and
   examining whether a sub-lattice exceeds a search scope according to the upper limit values of PED for each layer to search a better solution by utilizing the preliminary parameters.

2. The maximum likelihood detection method as claimed in claim 1, wherein the upper limit value of each layer indicates a sub-sphere radius imposed on a sub-lattice of each corresponding dimension.

3. The maximum likelihood detection method as claimed in claim 1, wherein the PED constraint function may be a monotonically increasing function with tree depth.

4. The maximum likelihood detection method as claimed in claim 1, wherein determining the initial radius r further comprises:
   obtaining an initial solution according to the zero-forcing vector; and
   calculating the initial radius r according to the zero-forcing vector and the initial solution.

5. The maximum likelihood detection method as claimed in claim 1, processing received data to obtain preliminary parameters further comprising:
   calculating a zero-forcing vector;
   generating an upper-triangular matrix R by QR-decomposition; and
   obtaining a channel ordering index vector.

6. The maximum likelihood detection method as claimed in claim 1, further comprising:
   obtaining an updated radius r from a better solution when the bottom layer is achieved;
   applying the constraint function to shorten the search span of each layer or, equivalently, restrict the sub-lattice of a smaller dimension within a smaller sphere.

7. The maximum likelihood detection method as claimed in claim 6, wherein when the updated radius r is obtained, the constraint function could be adjusted or not.

8. The maximum likelihood detection method as claimed in claim 5, further comprising applying a hard decision to the zero-forcing vector to obtain the initial solution.

9. The maximum likelihood detection method as claimed in claim 5, wherein the lower-right diagonal elements of R tend to be greater than that of the unordered one.

10. The maximum likelihood detection method as claimed in claim 5, further comprising determining the first and last column indexes of a matrix while calculating the zero-forcing vector such that the top-left diagonal component of the upper-triangular matrix R is the smallest while the bottom-right one is the greatest among all possible orderings.

11. A maximum likelihood detection system, comprising:
a preprocessing unit, processing received data to obtain preliminary parameters and determining an initial radius r; and
a searching unit, multiplying $r^2$ by a corresponding scaling factor according to a partial Euclidean distance (PED) constraint function to obtain the upper limit values of PED for each layer and examining whether a sub-lattice exceeds a search scope according to the upper limit values of PED for each layer to search a better solution by utilizing the preliminary parameters.

12. The maximum likelihood detection system as claimed in claim 11, further comprising:
a configure unit, determining the constraint function imposed on each layer.

13. The maximum likelihood detection method as claimed in claim 11, wherein determining the initial radius r further comprises:
obtaining an initial solution according to the zero-forcing vector; and
calculating the initial radius r according to the zero-forcing vector and the initial solution.

14. The maximum likelihood detection system as claimed in claim 11, wherein the preprocessing unit applies a hard decision to the zero-forcing vector to obtain the initial solution.

15. The maximum likelihood detection system as claimed in claim 11, wherein the upper limit value of each layer indicates a sub-sphere radius imposed on a sub-lattice of each corresponding dimension.

16. The maximum likelihood detection system as claimed in claim 11, wherein the preprocessing unit determines the first and last column indexes of a matrix while calculating the zero-forcing vector such that the top-left diagonal component of the upper-triangular matrix R is the smallest while the bottom-right one is the greatest among all possible orderings.

17. The maximum likelihood detection system as claimed in claim 11, wherein the PED constraint function may be a monotonically increasing function with tree depth.

18. The maximum likelihood detection system as claimed in claim 11, wherein the preprocessing unit further comprises:
calculating a zero-forcing vector;
generating an upper-triangular matrix R by QR-decomposition; and obtaining a channel ordering index vector.

19. The maximum likelihood detection system as claimed in claim 18, wherein the lower-right diagonal elements of R tend to be greater than that of the unordered one.

20. The maximum likelihood detection system as claimed in claim 11, further comprising:
obtaining an updated radius r from a better solution when the bottom layer is achieved;
applying the constraint function to shorten the search span of each layer or, equivalently, restrict the sub-lattice of a smaller dimension within a smaller sphere.

21. The maximum likelihood detection system as claimed in claim 20, wherein when the updated radius r is obtained, the constraint function may be adjusted or not.

22. A communication device, comprising:
a processing unit, processing received data to obtain preliminary parameters, determining an initial radius r, multiplying $r^2$ by a corresponding scaling factor according to a predefined partial Euclidean distance (PED) constraint function to obtain upper limit values of PED for each layer and examining whether a sub-lattice exceeds a search scope according to the upper limit values of PED for each layer to search a better solution by utilizing the preliminary parameters.

23. The communication device as claimed in claim 22, wherein the communication device is a mobile station, a base station, an access point, a portable device, or a desktop.

24. The communication device as claimed in claim 22, wherein the processing unit is a digital signal processing (DSP) unit or an application specific integrated circuit (ASIC).

* * * * *